Sept. 30, 1924.
C. A. FRAZIER
PIPE BAND
Filed Dec. 30, 1922
1,510,394
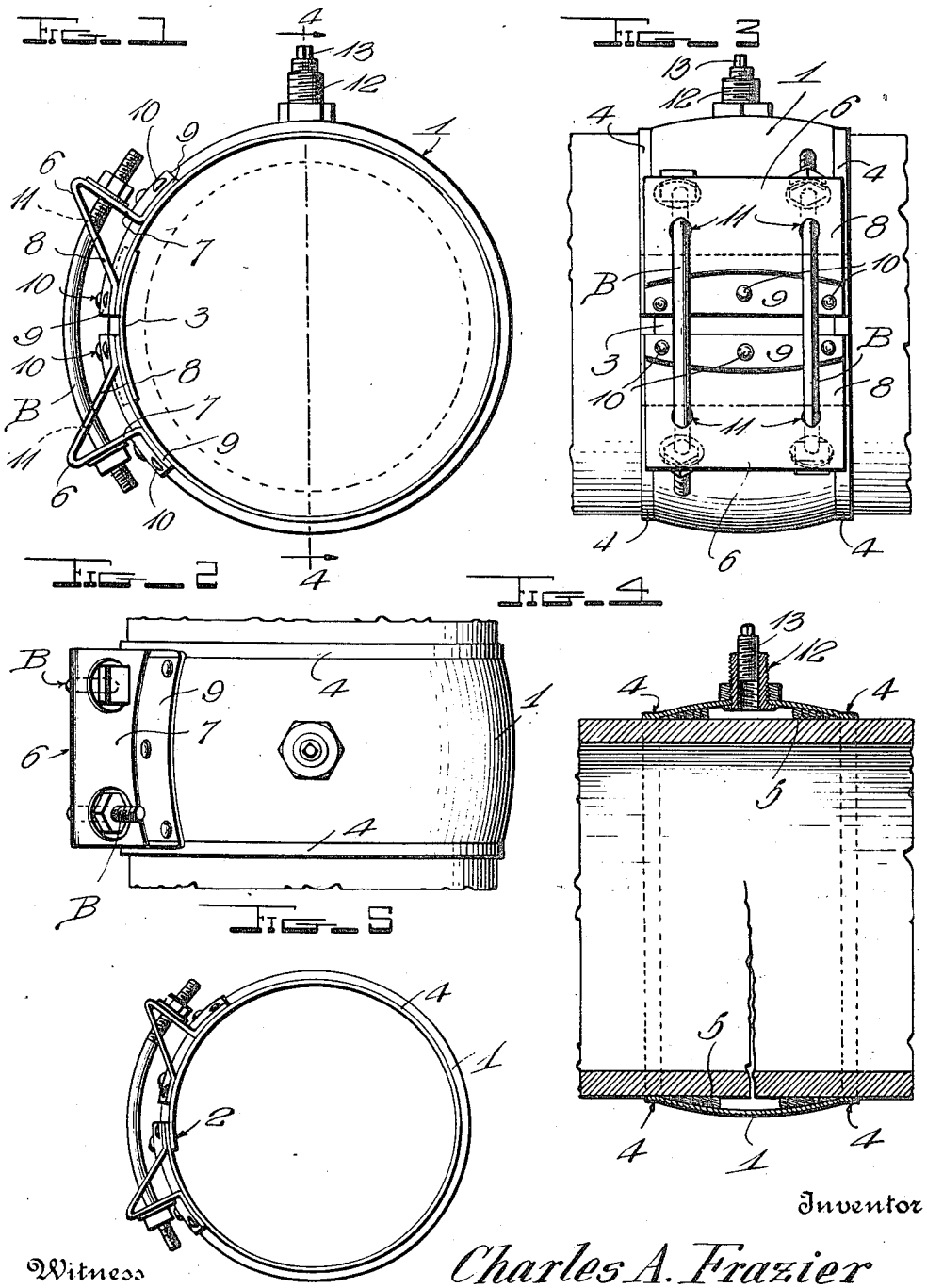
Witness
Inventor
Charles A. Frazier
By
Attorneys Patented Sept. 30, 1924.

1,510,394

UNITED STATES PATENT OFFICE.

CHARLES A. FRAZIER, OF FAIROAKS, CALIFORNIA.

PIPE BAND.

Application filed December 30, 1922. Serial No. 609,861.

*To all whom it may concern:*

Be it known that I, CHARLES A. FRAZIER, a citizen of the United States, residing at Fairoaks, in the county of Sacramento and State of California, have invented certain new and useful Improvements in Pipe Bands; and I do declare the following to be a full, clear, and exact description of the invention, such as will enable others skilled in the art to which it appertains to make and use the same.

My invention has for one object to provide an extremely simple and inexpensive band adapted to be applied to a leaking pipe to co-operate with a suitable packing, for the purpose of stopping the leak.

Other objects are to provide an improved process for sealing leaks and a new and effective sealing compound for carrying such process into effect.

With the foregoing in view, the invention resides in the novel subject matter hereinafter described and claimed, the description being supplemented by the accompanying drawing.

Figure 1 is an edge view of a pipe band constructed in accordance with my invention.

Figure 2 is a plan view.

Figure 3 is a side elevation.

Figure 4 is a vertical sectional view as indicated by line 4—4 of Fig. 1.

Figure 5 is a view similar to Fig. 1 but showing a different form of construction.

In the drawing above briefly described, the numeral 1 designates a transversely split metal band which may have its ends overlapped as indicated at 2 in Fig. 5, or may have said ends disposed in spaced relation and co-acting with a butt plate 3 as shown in Figs. 1 and 3. In either case, the edge portions of the band, designated by the reference numerals 4, are adapted to contact rather tightly with the outer side of a pipe, while between these edge portions, the band is bulged outwardly, with the extent of bulge decreasing toward and vanishing at the edge portions 4, so that when the band is clamped around the pipe, wedge-shaped pockets will exist adjacent its edges, into which the packing 5 later described, is forced by the pressure of the liquid leaking into said band.

The ends of the band 1 are formed with lugs 6 connected by clamping bolts B for contracting the band around the pipe and each of these lugs is preferably formed from a single metal plate bent upon itself into V-shape with a relatively short arm 7 and a longer arm 8, the edges of the arms 7 and 8, remote from the bend at the apex of the V, being bent laterally outward to form attaching flanges 9 which are shaped to conform to the external shape of the band 1 and are secured tightly against this band by rivets or the like 10. The relatively short arms 7 of the two lugs are at substantially right angles to the band and are spaced slightly from the ends of the latter, while the comparatively long arms 8 extend diagonally to said ends of the band to effectively brace the other arms. All of the arms are formed with circumferentially alined openings 11 which receive the clamping bolts B. By employing lugs constructed in the manner described, they are extremely strong and cannot be bent out of shape by tightening the bolts B and moreover, they so reinforce the ends of the band as to prevent them from being distorted in any manner when the bolts are tightened.

The device may be constructed either with or without a bleed nipple such as that indicated at 12 on the drawing. I have shown a closing plug 13 for this nipple but if desired a valve could be substituted.

One simple way of sealing a leak in a pipe by means of the invention, is by wrapping a suitable rope several times around the leaking portion of the pipe, then clamping one of the bands around this rope. The liquid leaking from the pipe through the break or the like therein, will force the rope outwardly and wedge it between the edge portions of the band and the pipe, forming an effective seal which in a short time will not leak to any extent whatever. If there is any sediment in the liquid running through the pipe, it soon fills the space between the band and the pipe and thus co-operates with the rope or other packing in producing the effective leak seal.

If the leak is unusually severe, it will be necessary to use a band with a bleed nipple which is opened to permit the water to escape from the band while the latter is being applied. Then, the nipple may be closed by a suitable plug or cap, or by a valve previously applied thereto. If a valve is used, it may be removed for use elsewhere, after the band has been applied to the pipe for some time and sealing of the leak has been effected.

In place of using rope or the like as above described, I may employ a sealing composition formed of sawdust or other pulp mixed with a binder which is soluble in water. This composition may be applied to the inner side of the band and when the water leaking from the pipe dissolves the binder, the pulp is wedged within the edge portions of the band and prevents leakage. If desired, bands of the composition may be formed to be wrapped around the pipe, instead of applying this composition to the inner side of the band.

In any of the numerous modified forms, in which the device may be constructed, it will be highly efficient and in every way desirable. In actual use, excellent results have been obtained from the details disclosed and they are therefore preferably followed. It is to be understood however that within the scope of the invention as claimed, numerous minor changes may be made.

I claim:

1. A leak-stop for pipes comprising a transversely split pipe-encircling band, lugs on said band at the end portions thereof, each of said lugs having arms extending in diverging relation toward the band, one arm of each lug being positioned substantially at right angles to the outer face of the band and the other arm extending at an incline from the first mentioned arm toward the ends of the band, the arms of said lugs being provided with openings which are alined circumferentially of the band, and a clamping bolt passing through said openings for drawing the band tightly around a pipe.

2. A leak stop for pipes comprising a transversely split pipe encircling band whose edge portions are adapted to snugly contact with a pipe encircled thereby, said band being outwardly bulged between said edge portions with the extent of bulge decreasing toward and vanishing at said edge portions, a pair of lugs on the ends of said band, each formed of a metal plate bent into V shape with a narrow side wall and a relatively wider side wall, the metal at the edges of said walls remote from the bending line being bent outwardly to form attaching flanges which conform to the cross sectional shape of the band and contact with the outer side of the latter, means securing said flanges to said band with said narrow walls substantially at right angles thereto and with the wider walls extending diagonally to the band ends, all of said walls having openings alined circumferentially, and a clamping bolt passing through said openings for contracting the band.

3. A leak stop for pipes comprising a transversely split pipe encircling band, lugs carried by the end portions of said band and each having arms extending in diverging relation towards the band and terminating in feet secured to the band, one arm being positioned at substantially right angles to the outer face of the band and the other arm extending at an incline from the outer end of the first-mentioned arm towards the end of the band, said lugs having their arms provided with openings aligned circumferentially of the band, and a clamping bolt passing through said openings for drawing the band tightly about a pipe.

In testimony whereof I have hereunto affixed my signature.

CHARLES A. FRAZIER.